US006808050B2

(12) United States Patent
Lehmann et al.

(10) Patent No.: US 6,808,050 B2
(45) Date of Patent: Oct. 26, 2004

(54) BRAKE DISK FOR A DISK BRAKE (75) Inventors: Wolfgang Lehmann, Remscheid (DE); Manfred Gronemann, Remscheid (DE); Helmut Ruppert, Remscheid (DE); John Watson, Bromborough (GB)

(73) Assignee: SAB Wabco BSI Verkehrstechnik Produtcs, GmbH, Remscheid (DE)

( * ) Notice: Subject to any disclaimer, the term of this patent is extended or adjusted under 35 U.S.C. 154(b) by 0 days.

(21) Appl. No.: 10/297,733

(22) PCT Filed: May 30, 2001

(86) PCT No.: PCT/EP01/06152
§ 371 (c)(1),
(2), (4) Date: Dec. 5, 2002

(87) PCT Pub. No.: WO01/96758
PCT Pub. Date: Dec. 20, 2001

(65) Prior Publication Data
US 2004/0031651 A1 Feb. 19, 2004

(30) Foreign Application Priority Data
Jun. 16, 2000 (DE) .......................................... 100 28 958

(51) Int. Cl.⁷ ................................................ F16D 65/78
(52) U.S. Cl. ................................ 188/218 XL; 301/6.8; 192/200
(58) Field of Search ....................... 188/218 XL, 264 A, 188/264 AA, 71.6; 301/6.3, 6.8; 192/70.16, 200

(56) References Cited

U.S. PATENT DOCUMENTS 5,988,761 A    11/1999  Visser et al.
6,076,896 A  * 6/2000  Bertetti et al. ............ 301/105.1
6,098,764 A  * 8/2000  Wirth et al. ............ 188/218 XL

FOREIGN PATENT DOCUMENTS

| DE | 1952313 | 1/1971 | |
| DE | 2060352 | 6/1972 | |
| DE | 3432501 | 3/1986 | |
| DE | 34 32 501 C2 | 3/1986 | |
| DE | 3814614 | 11/1989 | |
| EP | 85361 | 8/1983 | |
| EP | 235382 A1 * | 9/1987 | .......... F16D/65/12 |
| EP | 644349 | 3/1995 | |
| GB | 1080035 | 8/1967 | |

* cited by examiner

Primary Examiner—Matthew C. Graham
Assistant Examiner—Xuan Lan Nguyen
(74) Attorney, Agent, or Firm—Kelly Lowry & Kelley, LLP (57) ABSTRACT

The invention relates to a brake disc for a rail vehicle, with which a hub body (16) and a brake ring (12) are connected to one another such that with braking procedures a thermal expansion of the brake ring (12) relative to the hub body (16) is possible. At the same time screws (15) pass through axially aligned openings in a hub flange (14) arranged on the hub body (16) and a brake ring flange (13) arranged on the brake ring (12). According to the invention the screws at their end exiting the brake ring flange (13), by way of a retaining element which, for example, may be a retaining lug (17) formed integrally on the hub body (16) or a retaining bracket fixed on the hub body, may be fixed relative to the hub body (16) so that an axially parallel position of the screws (15) and a centering of the brake ring (12) is ensured even with thermal expansions. The mounting of the screws (15) is effected indirectly via an axially displaceably movable sleeve (20) or by a retaining braket engaging into a groove on the hub. Furthermore there are provided radial guides for the brake ring (12) which may be realised, for example, by the guiding of the sleeve (20) in a slide block.

20 Claims, 6 Drawing Sheets

Fig.1

Detail A

Fig. 2

Detail C

BRAKE DISK FOR A DISK BRAKE

TECHNICAL FIELD

The invention relates to a brake disc for a disc brake, in particular for rail vehicles. This contains a hub body with a radially outwardly extending hub flange with axially parallel openings in which screws may be arranged in order to connect a brake ring flange of a brake ring to the hub body, said brake ring flange being arranged radially overlapping and axially adjacent the hub body. It further relates to a brake ring for a disc brake, in particular for rail vehicles containing a radially extending brake ring flange with axially parallel openings in which screws may be arranged in order to connect a hub flange of a hub body to the brake ring, said hub flange being arranged radially overlapping and axially adjacent the brake ring flange.

STATE OF THE ART

Disc brakes of the above mentioned type are for example known from DE 26 20 623 A1 (FIGS. 1 and 2). They consist of a hub body which is arranged in a rotationally fixed manner on the shaft of the axle of a vehicle, as well as a brake ring connected to the hub body. The brake ring on at least one outer side comprises a friction surface on which brake shoes engage and by way of a suitable pressure on the friction surface may exert the desired braking effect. The connection between the hub body and the brake ring is effected via a screwing of the hub flange with the brake ring flange. The mentioned flanges are radially distant from the hub body or brake ring, overlap in the radial direction and are arranged axially adjacent one another. The details "radial" and "axial" or "axially parallel" relate to the rotational axis of the brake disc (the same as the axis of the shaft on which the brake disc is attached), which as a rule is also an axis of symmetry of the brake disc. Furthermore the flanges may be designed peripherally in a continuous manner as well as peripherally in a wave-like manner, wherein in the latter case they consist of adjacent lugs. The screws for fastening the brake ring on the hub body pass through openings in the hub flange and in the brake ring flange, these openings being essentially aligned to one another.

It is known that with disc brakes of the mentioned type, with braking procedures the brake ring expands on account of the occuring heating, whereas the hub body does not experience any comparable expansion. A multitude of designs are known for accommodating or for compensating the thermal expansions occuring between the hub flange and the brake ring flange.

Thus for example DE-B 10 31 337 shows a disc brake of the above mentioned type with which the screwing between the hub flange and the brake ring flange is designed such that a radial relative movement between both bodies is possible. In particular there are provided radial slots in the brake ring flange distanced equally over the circumference in which the screws which pass through it may travel radially. However with such a design there exists the danger that with thermal expansions the screws may lose their parallel position to the axis of the disc brake. Thus for example the screw heads may retain their position relative to the hub flange on which they rest, whilst the screw section lies in the brake ring flange and is displaced radially outwards by this on thermal expansion. This leads to considerable bending stresses of the screws which may lead to an increased wear, premature fatigue and in the worst case to a failure of the screws.

For reducing the mentioned bending stresses of the screws, in DE-A 28 28 137 it is known in a disc brake of the initially mentioned type to mount the screw heads as well as nuts in spherical bearing shells, by which means the screws may be pivoted out of their axially parallel bearings essentially without bending and shear stresses. This embodiment form however is very complicated and thus expensive and with thermal expansions leads to undesired changes in the pretension of the screws.

From DE 34 32 501 C2 there is further known a disc brake of the initially mentioned type with which the brake ring flange is arranged movable with thermal expansion between the hub flange and a separate tension ring, wherein the screws axially tension the hub flange against the tension ring. The respective ends of the screws are thus mounted in the hub flange or in the tension ring and thus in two elements which as a rule are not subjected to a relative movement on thermal expansion. It is however disadvantageous that additional means for torque transmission mentioned type to mount the screw heads as well as nuts in spherical bearing shells, by which means the screws may be pivoted out of their axially parallel bearings essentially without bending and shear stresses. This embodiment form however is very complicated and thus expensive and with thermal expansions leads to undesired changes in the pretension of the screws.

From DE 34 32 501 C2 there is further known a disc brake of the initially mentioned type with which the brake ring flange is arranged movable with thermal expansion between the hub flange and a separate tension ring, wherein the screws axially tension the hub flange against the tension ring. The respective ends of the screws are thus mounted in the hub flange or in the tension ring and thus in two elements which as a rule are not subjected to a relative movement on thermal expansion. It is however disadvantageous that additional means for torque transmission must be provided between the hub body and the tension ring so that no bending stresses of the screws occur perpendicular to the radial direction. On account of these means the constructional effort is increased and the assembly is made more difficult. With disc brakes ventilated at the inside, the tension ring may considerably handicap the supply of cooling air to the brake disc. Furthermore there also exists the possibility that with thermal expansion, the forces on the tension ring occur assymetrically with respect to the rotational axis of the disc brake and that on account of this the undesired bending stresses indeed do arise.

From DE-OS 20 60 352 there is known a multi-part brake disc with which on a hub there are provided radially outwardly extending lugs which have axially parallel openings in order to fasten an overlappingly arranged lug of a brake ring by way of corresponding screws, wherein in each case two lugs distanced from one another are in each case provided with an opening through which the ends of the screw may be held. At the same time one envisages designing the fastening screws for the brake ring consisting of brake ring elements as fitting bolts. In order to design the screw connection such that it is axially free of play, may be readjusted in limits and additionally is tensionally locked, at the same time each lug is tensioned against the end face of the hub via bushings.

DESCRIPTION OF THE INVENTION, OBJECT, SOLUTION, ADVANTAGES

Against this background it was the object of the present invention to improve a hub body, a brake ring and a brake disc of the initially mentioned type with simple design means in a manner such that with thermal expansions of the brake the axial parallelity of the screws which connect to brake ring flange to the hub flange is ensured. arranged a retaining element with all, but at least with three openings arranged distributed over the circumference.

With the brake disc according to the invention thus both ends of the screws which connect the hub flange to the brake ring flange are fixed relative to the hub body. The first end of the screw which may for example be the screw head, is mounted in an opening on the hub flange. The screw then passes through the brake ring flange, and its second end is held in the retaining element which is fixed on the hub body and transmits this fixation onto the end of the screw. By way of the radial fixing of the screws at both ends their axially parallel position is ensured even with thermal expansions of the brake ring. This is also the case with the use of several retaining elements if the forces should not occur symmetrically with respect to the rotational axis of the brake disc. By way of radial guides according to claim 4 it is ensured that the brake ring always remains centred relative to the axis of the brake disc even with thermal expansions.

According to a first embodiment form of the retaining elements according to the invention these may be designed as a radially outwardly extending retaining lug or as a circumferential retaining flange on the hub body. The formation of the retaining element as a retaining lug on the hub body has the advantage that between two such lugs there remains a free space through which cooling air may flow during operation. Furthermore on assembly of the brake disc, in a simple manner a likewise lug-shaped designed brake ring flange may be introduced through the free space into the intermediate space between the hub flange and the retaining elements. The integral formation of the retaining element with the hub body simplifies the assembly of the brake disc since the retaining elements do not need to be assembled separately.

In a further formation of the last mentioned embodiment form the retaining element formed on the hub body may comprise an axially parallel opening with a sleeve arranged therein, wherein the opening in the retaining element is arranged aligned to the corresponding opening in the hub flange. A screw passing through the hub flange and the braking ring flange may be led through the sleeve, wherein the sleeve is then supported on one side on the braking ring flange. The sleeve serves for pretensioning the brake ring against the hub flange. This is effected via the support of the sleeve on the brake ring flange, wherein on the opposite end of the sleeve the screw engages on the screw thread via the screw head or the nut. By way of the mounting in the sleeve the screw at the same time is additionally protected from bending stresses. By way of the fact that the sleeve is arranged in the opening of the retaining element, furthermore an indirect radial fixing of the screw end relative to the hub body is achieved. At the same time the sleeve however remains axially parallel displaceable in the opening of the retaining element, so that it may transmit the desired axial pretension force onto the brake ring flange.

According to a further formation of the above mentioned embodiment form, on the hub flange and/or on the retaining elements there are provided at least three radial guides equally distributed over the cicumference, which may cooperate with corresponding radial guides on the brake ring flange, in order in the case of a thermal expansion to radially guide and, centre the brake ring flange. The equal distribution of the radial guides over the circumference means that for example three such radial guides at a distance of in each case 120° are arranged around the rotational axis of the disc brake. The radial guides ensure that although the brake ring may move in the radial direction relative to the hub body and thus may follow a thermal expansion, however no relative rotation of the brake ring about the rotational axis of the brake disc is possible and that the torque transmission between the brake ring and hub body and their relative position in the circumferential direction remains ensured. Simultaneously the radial guides pointing in various radial directions ensure that the brake ring and hub body assume a centered position to one another also with a thermal expansion.

The above mentioned radial guides in each case are preferably formed as two surfaces extending parallel to a radius on the hub flange and/or on a retaining element, which cooperate with corresponding surfaces on the brake ring flange. The extension of the surfaces parallel to a radius proceeding from the rotational axis of the disc brake ensures that the surface exerts a guide in the direction of this radius.

According to a second design form of the retaining element of the present invention, this is formed as an L-shaped retaining bracket which in a first limb comprises an opening for leading through the end of the screw. Furthermore on the hub body there is provided an axially orientated groove in which the second limb of the mentioned retaining bracket may be arranged. The orientation of the groove is defined as the direction from the base of the groove towards its opening, that is to say parallel to the walls of the groove. Of course this embodiment form of the retaining elements may also be combined with the above explained form since the individual retaining elements distributed along the circumference of the hub body are basically independent of one another. The L-shaped retaining bracket is mounted in the axially orientated groove on the hub body in a manner such that it remains movable in the axial direction and is fixed in the radial direction as well as preferably also in the circumferential direction. As a whole then the desired radial fastening of the retaining bracket is achieved, wherein the retaining brackets however simultaneously with the tightening of the screws move axially and thus may transmit the set pretension force onto the brake ring flange. The use of retaining brackets has the advantage that on assembly of the disc brake these may firstly be removed so that the brake ring and disc body may be put together in an unhindered manner. Only on tightening the screws are the retaining brackets then attached after one another. Furthermore by way of the application of the variously dimensioned retaining brackets there may be effected a simple adaptation of the dimensions of the brake ring and hub body.

The invention furthermore relates to a brake ring for a disc brake, in particular for rail vehicles, containing a radially extending brake ring flange with axially parallel openings in which there may be arranged screws in order to connect a hub flange arranged radially overlapping and neighbouring the brake ring flange to the brake ring. The brake ring is characterised in that with at least one opening there is arranged a retaining element which is fixed on the brake ring and by way of which the end of the screw may be held after its passage through the hub flange.

With such a brake ring the two ends of the screws are fixed relative to the brake ring. The brake ring on construction of the disc brake therefore functionally behaves in the same manner as the above explained hub body. The possibilities of design of the hub body explained above may thus be accordingly applied to the brake ring.

Furthermore a brake disc, in particular a brake disc for rail vehicles, containing a hub body as well as a brake ring fastened to this, also belongs to the invention. The brake disc is characterised in that the hub body is designed in the manner explained above and/or in that the brake ring is designed in the manner explained above, and that the end of the screw is held by the retaining element fixed on the hub body or on the brake ring. With such a brake disc by way of the fixation of the screw ends on both sides it is ensured that the screws retain their axially parallel position even with a thermal expansion of the brake ring and, the screws as well as the brake ring remain centered with respect to the axis of the disc brake. Furthermore as explained above with reference to the hub body, one achieves a simplification of the assembly as well as a guarantee of the ventilation of the brake ring.

According to a further embodiment form it is envisaged for the screw to be designed such that firstly the head has a surface which by way of its bearing an a collar of the hub formed specially as a support, there is effected a rotational securement when screwing the nut on and off, and secondly below the head there is incorporated a knurling which on assembly of the screw into the hub digs into the receiver bore and by way of this firmly retains the screw with a press fit in the hub so that on assembly of the brake ring it does not need to be held in position by hand.

BRIEF DESCRIPTION OF THE DRAWINGS

In the following the invention is explained by way of example with the help of the figures. There are shown in.

BEST WAY OF CARRYING OUT THE INVENTION

Figure 1:
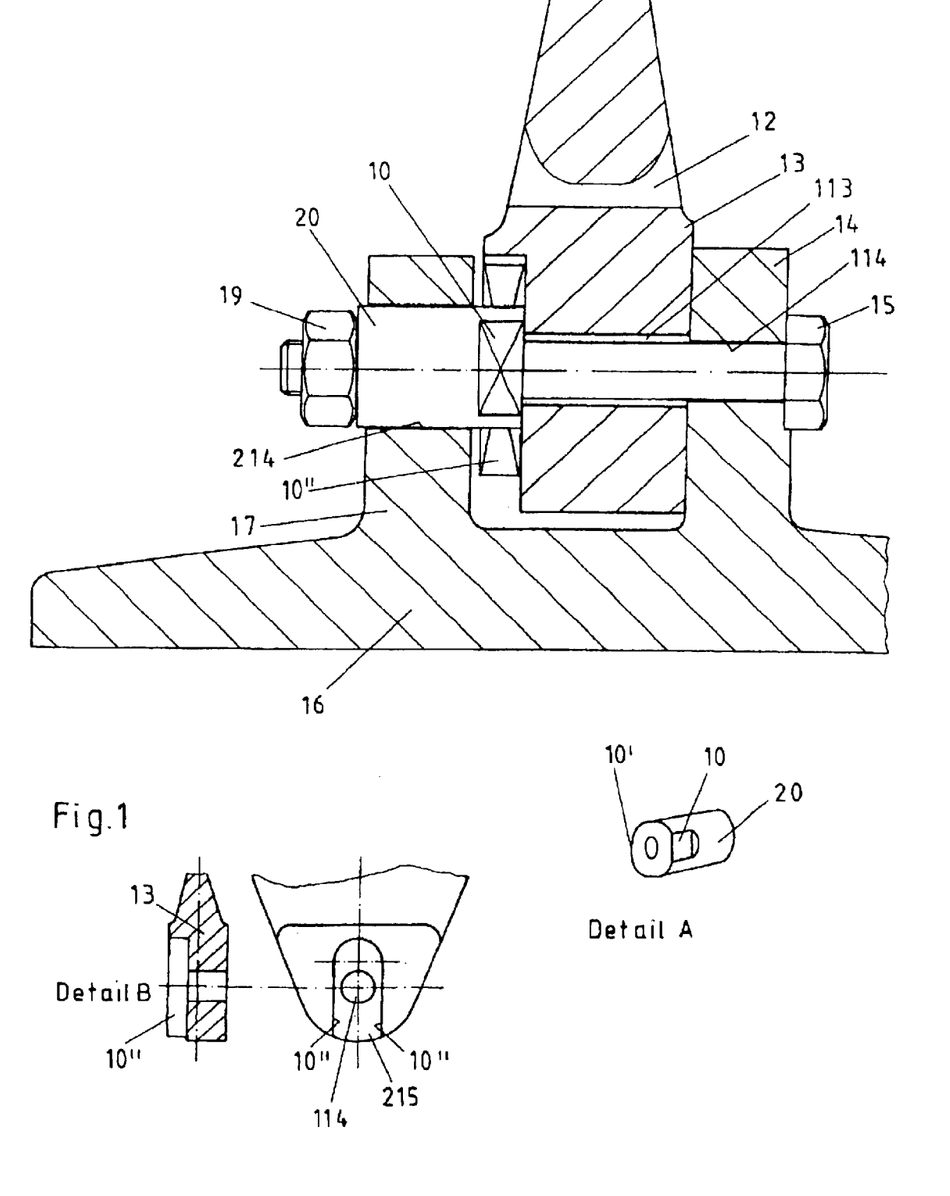
FIG. 1 a cross section through the screw connection of a hub body with a brake ring as well as perspectively the sleeve used in this.

In FIG. 1 there is shown a cross section through the screw connection between the hub body 16 and the brake ring 12. The hub body 16 is arranged on the shaft of the axle of a rail vehicle (not shown) in a rotationally fixed manner and is connected to the brake ring 12 in a rotationally fixed manner. The brake ring 12 on one or on two sides comprises friction surfaces (not shown) on which brake shoes may engage for producing the braking force. Since with the braking procedure there occurs the production of heat at the brake ring 1, the connection between the brake ring 12 and the hub body 16 must be designed such that a thermal expansion of the brake ring 12 may be effected and simultaneously a secure and centred seating of the brake ring relative to the hub body 16 or to the rotational axis of the brake disc is ensured. Simultaneously it is desirable for the screws 15 used for connection of the hub body 16 to the brake ring 12 to be protected from bending stresses in the case of thermal expansion.

With the brake disc shown in FIG. 1 the connection between the brake ring 12 and the hub body 16 is effected via a screw 15 which passes through an axially parallel opening 114 in the hub flange 14 which extends radially (that is to say upwards in the drawing) and which is integrally formed on the hub body 16. Furthermore the screw passes through an axially parallel opening 113 in the brake ring flange 13 which is formed on the inner radial edge of the brake ring 12 and is arranged axially neighbouring the hub flange 14. The fixation of the brake ring 12 on the hub body 16 is effected by a nut 19 placed onto the free end of the screw 15 and its tightening with a predetermined tightening torque (typically 36 Nm). At the same time between the nut 19 and the brake ring flange 13 there is arranged a sleeve 20 through which the screw is guided and which with one end is supported on the brake ring flange 13. The nut 19 bears on the other end of the sleeve 20 in order to indirectly exert the defined pretension force onto the brake ring flange 13.

According to the invention, a retaining lug 17 is arranged axially distant to the hub flange 14 on the hub body 16 and comprises an opening 214 which is aligned to the openings in the hub flange 14 and the brake ring flange 13. The sleeve 20 is guided in the opening of the retaining lug 17 with a tight fit. The retaining lug 17 thus fixes the sleeve 20 with regard to a movement in the radial direction and in the circumferential direction, by which means simultaneously the free end of the screw 15 located in the sleeve 20 is fixed in a corresponding manner. At the same time however an axially parallel displacement of the sleeve 20 in the opening of the retaining lug 17 is possible, so that on tightening the nut 19 on the screw 15 the sleeve 20 may travel in the direction of the brake flange 3 and here exert the desired pretension force.

With the described arrangement the two ends of the screw 15 are mounted fixed with respect to the hub body 16 so that the screw 15 may retain its axially parallel position even with a thermal expansion of the brake ring 12. By way of this the loading on the screw and thus the wear and the danger of destruction is reduced. At the same time the sleeve 20 which surrounds the screw 15 to a considerable part of approx. 10 to 40% of the axial extension, contributes to a stabilisation with respect to bending stresses.

In the design of the screw connection shown in FIG. 1 there is furthermore provided a radial guide which permits the brake ring 12 to grow radially in the case of thermal expansion and simultaneously centres it. Such radial guides are preferably uniformly distributed over the circumference around the rotational axis of the disc brake, for example in the form of three radial guides at a distance of in each case 120.degree. (cf. FIG. 4, 27a). The radial guide with the embodiment form according to FIG. 1 is achieved in that on that end of the sleeve 20 which faces the brake ring flange 13 there are provided two milled recesses lying opposite with respect to the sleeve axis, by way of which two parallel surfaces 10, 10' are formed on the sleeve 20 (detail A). Furthermore the side of the brake ring flange 13 facing the sleeve 20 comprises a milled recess 215 which preferably comprises two parallel surfaces 10" formed at an equal distance to the opening for leading through the screw 15. The distance of these surfaces 10" corresponds to that of the parallel surfaces 10, 10'. The sleeve fills the space between the milled recesses in the brake ring flange 13. That end of the sleeve 20 which faces the brake ring flange 13 engages into the space formed by this milled recess, wherein the chamfered surfaces 10, 10' of the sleeve 20 bear on the planar surfaces 10" of the milled recess in the brake ring flange. The cooperation of the sleeve 20 and surfaces 10"

thus ensures a guided radial movability between the sleeve 20 and the brake ring flange 13 in the case of a thermal expansion of the brake ring 12.

Figure 2:
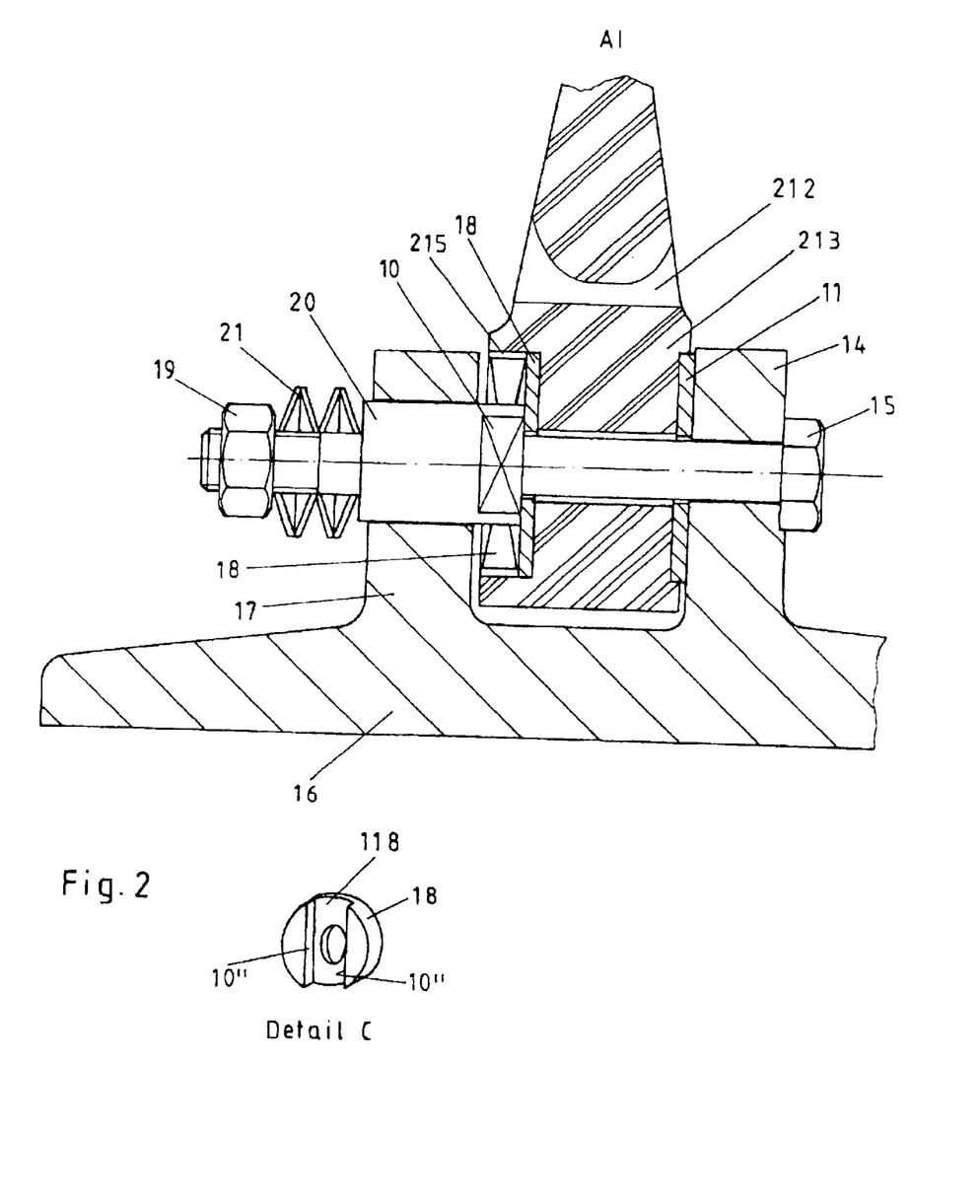
FIG. 2 a cross section through an embodiment example modified with respect to FIG. 1, and a slide block.

The variant shown in FIG. 1 is in particular suitable with the application of brake rings 12 of iron. A modification of this embodiment form which is preferably suitable for brake rings 212 of aluminium is shown in FIG. 2. With this on the hub body 16 there is arranged a retaining lug 17 which is axially distanced to the hub flange 14 and which comprises an opening concentric to the opening for leading through the sleeve 20. The brake ring flange on the side of the retaining lug 17 has a cylindrical milled recess. The diameter of this, milled recess is larger than the diameter of the sleeve 20 so that a slide block 18 may be arranged in the milled recess. The slide block 18 fills the milled recess in the brake ring flange 213 up to a central groove 118 extending in the radial direction. That end of the sleeve 20 which faces the brake ring flange 213 engages into this groove 118, wherein the chamfered surfaces 10, 10' of the sleeve 20 (detail A, FIG. 1) bear on the planar surfaces 10" of the groove in the slide block 18 (detail C). The cooperation of the sleeve 20 and the slide block 18 thus ensures a guided relative movability between the sleeve 20 and slide block 18 in the case of a thermal expansion, of the brake ring 212. At the same time the same parts have been given the same reference numerals as FIG. 1 and are hereinafter not explained again.

The difference to the embodiment form according to FIG. 1 additionally lies in the fact that conical spring washers 21 are arranged between the sleeve 20 and the nut 19, which ensure that a defined axial tension force is exerted between the brake ring flange 213 and the hub flange 14 independently of the temperature of the brake ring flange. Furthermore a further washer 11, is arranged between the brake ring flange 213 and the hub flange 14.

As is evident from the FIGS. 1 and 2 one may combine the same hub body 16 with various brake rings 12, 212. It is indeed a particular advantage of the present invention that the brake discs may be composed of various components according to requirement in a modular system, without the complete brake disc having to be manufactured again.

Figure 3:
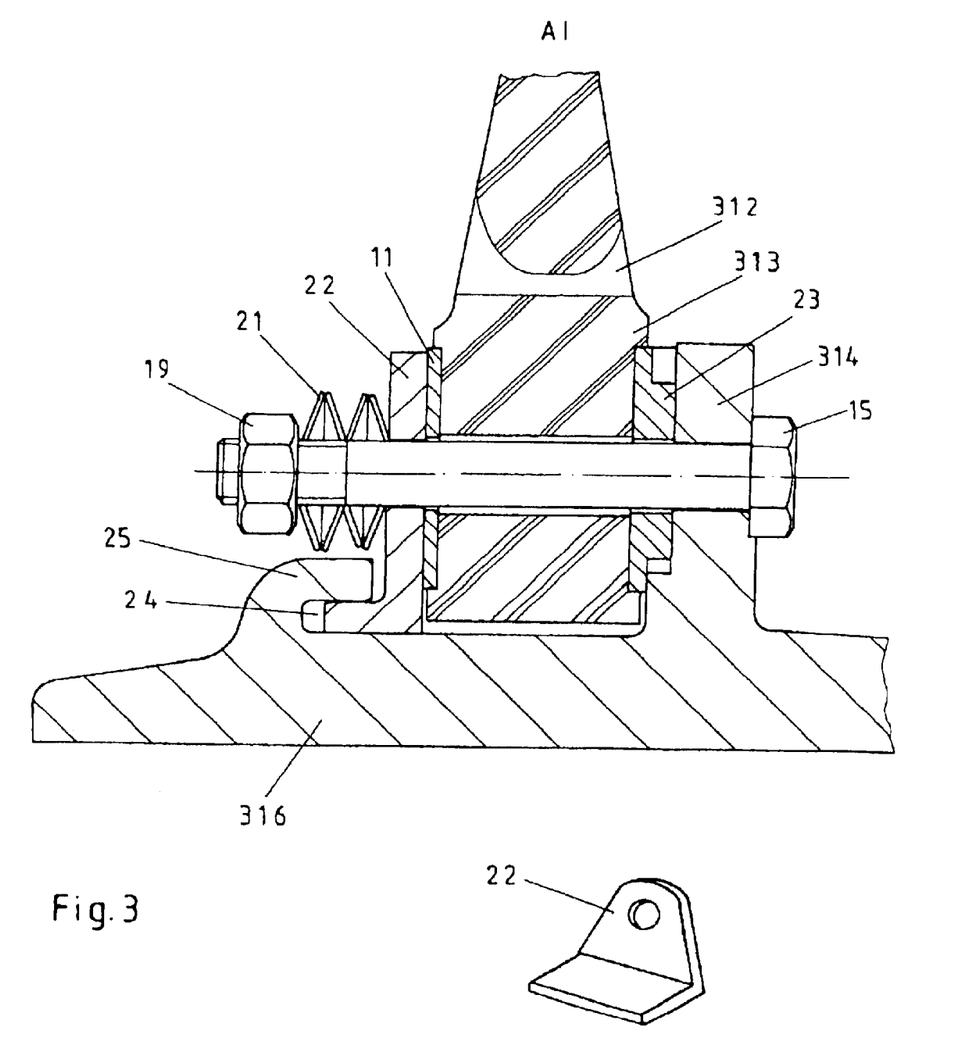
FIG. 3 a cross section through a further modified embodiment form and a perspective view of a retaining bracket used therein.

An alternative embodiment form of the screw connection between a hub body 316 and a brake ring 312 of aluminium is shown in FIG. 3. The same elements are provided with the same reference numerals as with the embodiment form according to FIG. 1, and are subsequently not explained again.

The essential difference of the embodiment form according to FIG. 3 to the previously mentioned embodiment forms lies in the fact that in place of a retaining lug 17 there is formed a hook-like projection 25 on the hub body 316 which extends axially parallel and by way of this forms a likewise axially parallel groove 24 towards the hub body 316. One limb of an L-shaped retaining bracket 22 is introduced into this groove 24 so that the retaining bracket 22 is fixed in the radial direction, but at the same time remains movable in the axial direction. The second limb of the retaining bracket 22 extends radially outwards (in FIG. 3 upwards). This limb lies axially neighbouring the brake ring flange 313 as well as indirectly neighbouring the hub flange 314. That free end of the screw 15 which lies opposite the screw head is guided through an opening which is arranged in the middle of the limb and which is aligned with the openings in the hub flange 314 and in the brake ring flange 313. The nut 19 which via conical spring washers 21 exerts a defined tension force on the retaining bracket 22 is screwed onto this free end. On account of its axially moveable mounting the retaining bracket 22 may exert this tension force onto the brake ring flange 313 via the disc 11.

Furthermore a slide block 23 is arranged between the hub flange 314 and the brake ring flange 313, which on the one hand is radially guided in a corresponding milled recess in the proximal side of the brake flange 313 and on the other hand is fixed in a relief of the hub flange 314.

Figure 4:
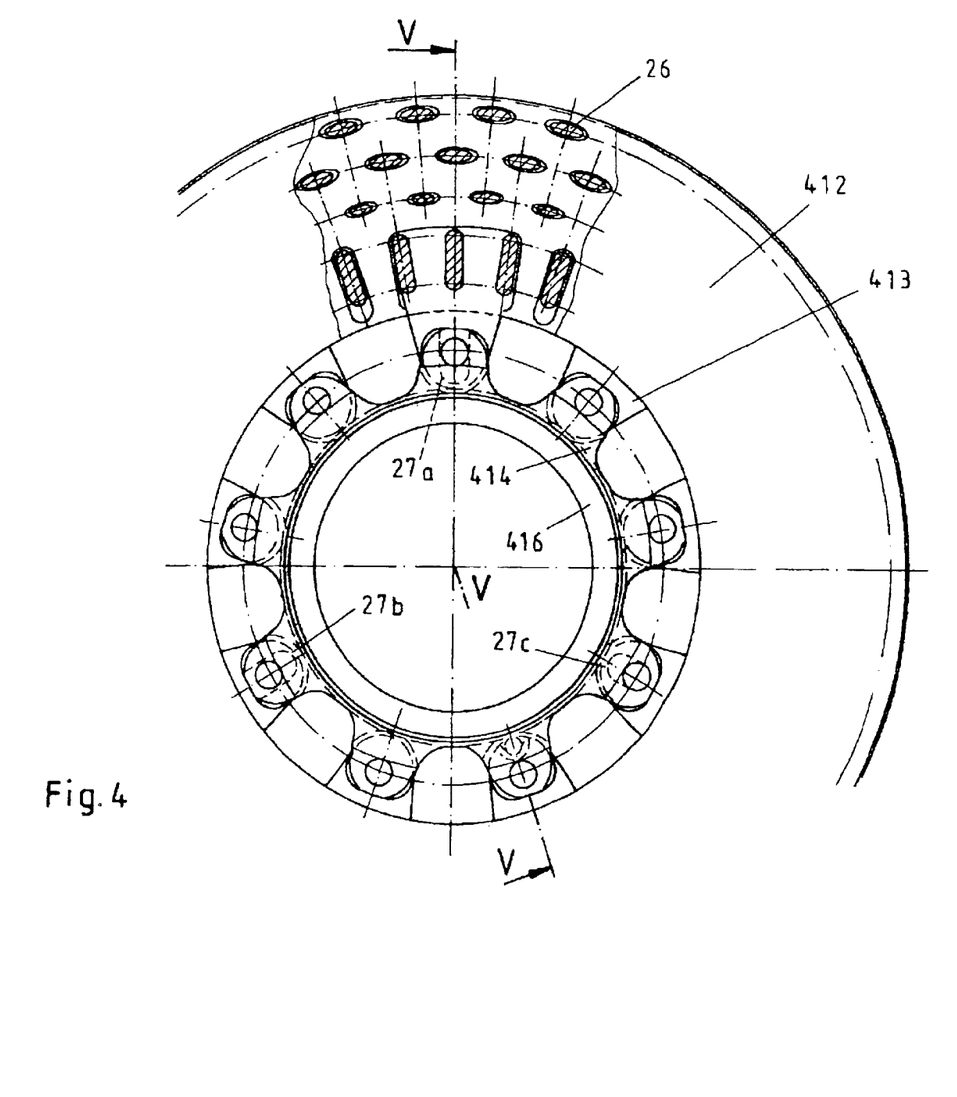
FIG. 4 a plan view of a brake disc composed of the hub body and brake ring with the surface of the brake ring partly broken.

In FIG. 4 there is represented a lateral view of a brake disc with which the front friction surface of the brake ring 412 is partly broken. By way of the breaking-up which extends roughly up to the middle plane of the brake ring 412, the connection webs 26 are recognisable in section, which connect the surfaces of the brake ring 412 lying opposite one another to one another.

It may further be recognised that the brake ring 412 on its inner edge comprises a brake ring flange in the form of radially inwardly projecting lugs 413. These lugs 413 are fastened on corresponding lugs 414 on the hub body 416.

Furthermore it may be recognised from FIG. 4 that there are formed three radial guides 27a, 27b, 27c arranged uniformly distributed at an angular distance of 120°. In their cooperation these three radial guides ensure that the brake ring 412 may move radially and at the same time remains centered with respect to the rotational axis of the disc brake in the case of a thermal expansion. The radial guides are realised in that slide blocks connected to the brake ring flange with a positive fit are arranged in corresponding, radially aligned guide grooves of the hub flange, or slide blocks connected with a positive fit to the retaining element of the hub 17 are arranged in corresponding radially aligned guide grooves of the brake ring. The remaining screw connections on all sides are provided with a suitable play so that they also permit a radial movement.

Figure 5:
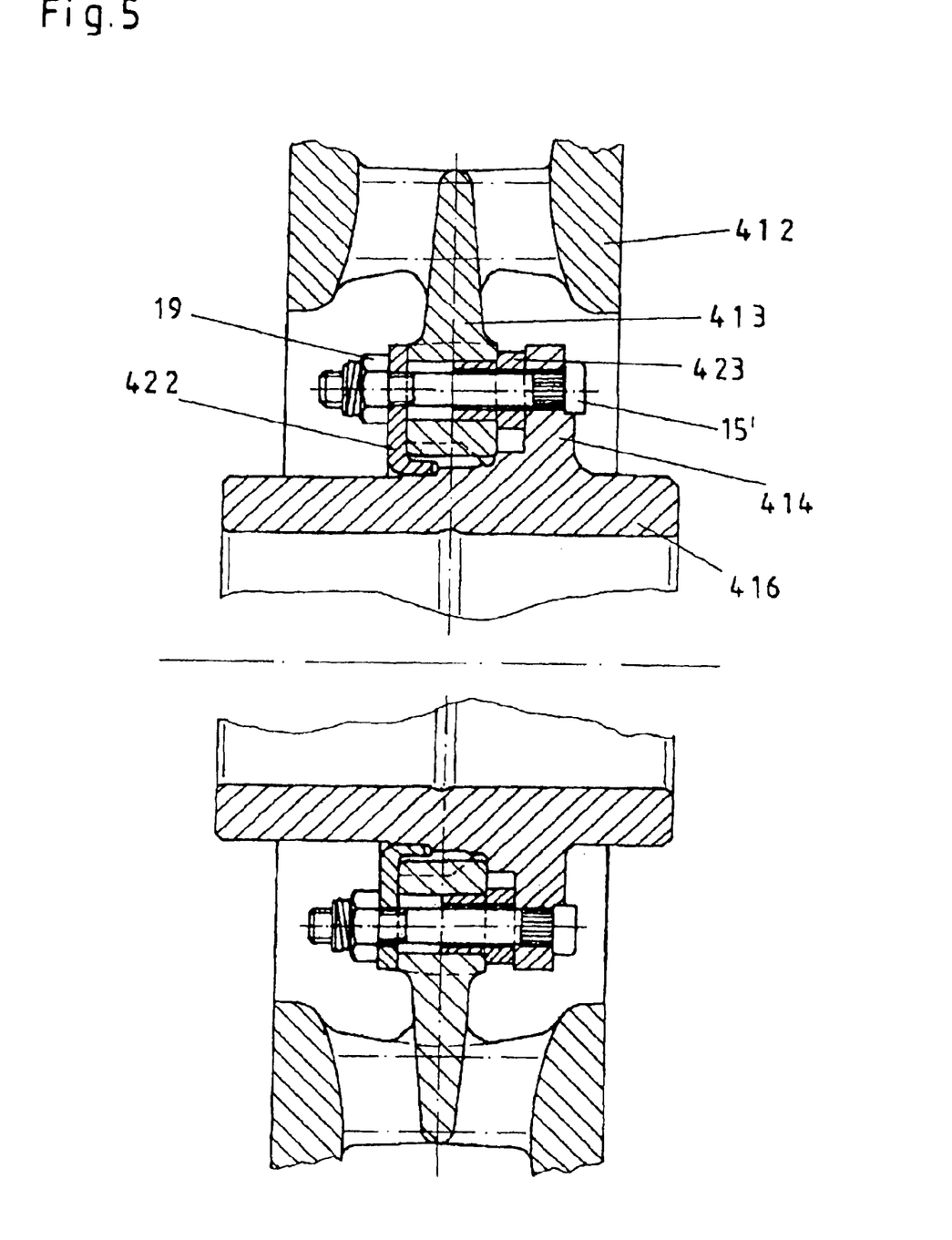
FIG. 5 a cross section along line V—V of FIG. 4.
Figure 6:
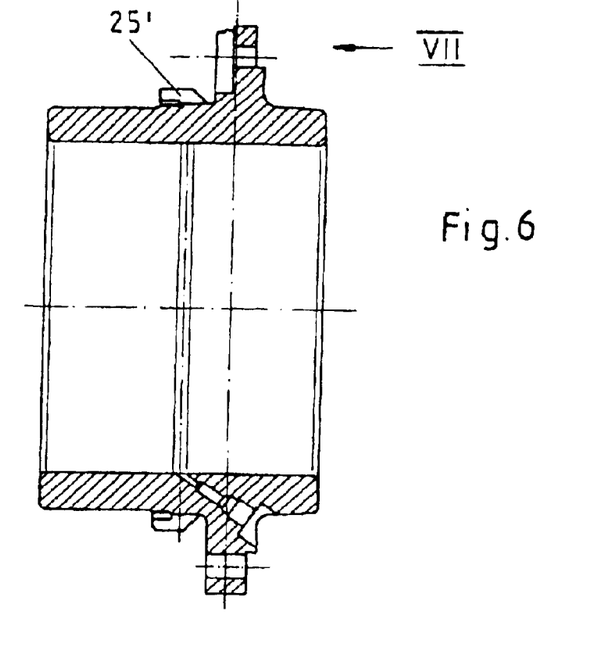
FIG. 6 the hub body according to FIG. 5.
Figure 7:
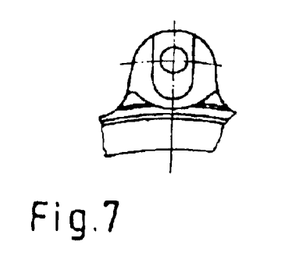
FIG. 7 a part view of the hub body according to arrow VII in FIG. 6.
Figure 8:
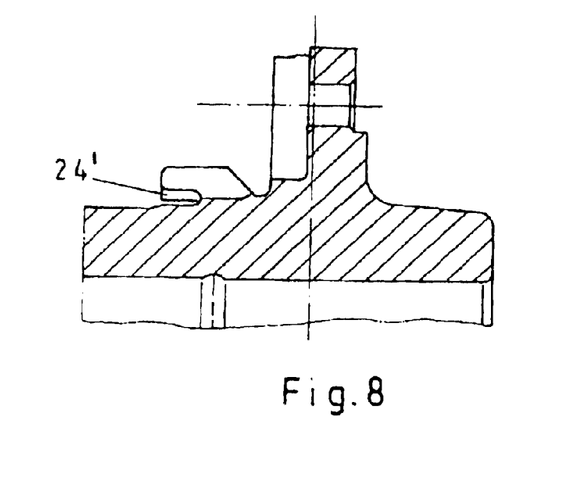
FIG. 8 an enlarged part representation of the hub body according to FIG. 6.

The construction of the screw connections in the brake disc is recognised from the section shown in FIG. 5 along the line V—V of FIG. 4 which is shown running at angles, and FIGS. 6 and 8. The radially inwardly directed lugs 413 of the brake ring 412 are connected via a screw 15' to the hub lug 414 on the hub body 416, wherein the screw 15' is fixed in a retaining bracket 422 on that end lying opposite the hub lug 414. The arrangement thus corresponds essentially to that of FIG. 3, wherein however the short, axially parallel limb of the retaining bracket 422 is arranged rotated by 180° and thus points in the direction of the hub lug 414. It may further be recognised that between the lug 413 of the brake ring and the hub lug 414 there is arranged a slide block 423 which is radialy guided in a radially orientated groove in the lug 414. The manner of functioning of the hook-shaped projection 25' (FIG. 6) and of the axially parallel groove 24' (FIG. 8) have already been explained by way of FIG. 3.

The design of the disc brake according to the invention has the advantage that one embodiment of the hub body may be combined with various brake rings—typically in a diamater range of 590 to over 700 mm. The hub design may just as easily be used with brake rings of different materials, for example Al (aluminium substrate material with friction surfaces of metal matrix composite material with SiC particles), CC—SiC (carbon fibre composite material infiltrated with SiC), GG (cast iron with nodular graphite) or GS (cast steel).

An assembly of the disc brake is possible without a special tool on account of its simple design. Furthermore by way of the formation of lug connections and the intermediate spaces which remain free there is ensured an improved ventilation efficiency which results in a greater conversion of energy and an extended lining sevice life. With an equal loading therefore an increased serviceable life of the brake ring is achieved.

List of Reference Numerals 10, 10', 10" surfaces
11 disc
12, 212, 312, 412 brake ring
114 opening
14, 314, 414 hub flange
114, 214 opening
15, 15' screw
16, 316, 416 hub body
17 retaining lug
18 slide block
19 nut
20 sleeve
21 conical spring washer
22, 422 retaining bracket
23, 423 slide block
24, 24' groove
25, 25' projection
26 connection web
27a, 27b, 27c radial guide
215 milled recess
118 groove
13 brake ring flange

What is claimed is:

1. A brake disc for a disc brake, containing a hub body (16) with a radially outwardly extending hub flange (14, 314, 414) with axially parallel openings (114) in which screws (15, 15') are arranged in order to connect a brake ring flange (13, 213, 313, 413) of a brake ring (12, 212, 312, 412) to the hub body (16, 316, 416), said brake ring flange being arranged radially overlapping and axially adjacent the hub body, wherein with at least one opening (114) there is arranged a retaining element (17, 22, 422) which is fixed on the hub body (16, 316, 416) and by way of which the end of the screw (15, 15') is held after its passage through the brake ring flange (13, 213, 313, 413), characterised in that at least one of the retaining elements is formed as an L-shaped retaining bracket (22, 422) which in a first limb comprises an opening for leading through the end of the screw (15, 15'), and that on the hub body (316, 416) there is provided an axially orientated groove (24, 24') in which a second limb of the retaining bracket (22) is arranged.

2. A brake disc according to claim 1, characterised in that on either one of the hub flange (314, 414) or the retaining elements (17) there are provided at least three radial guides (27a, 27b, 27c) which are arranged uniformly distributed over the circumference and which may cooperate with corresponding radial guides on the brake ring flange (13, 213, 313, 413) in order to radially guide and center the brake ring flange in the case of thermal expansion.

3. A brake disc according to claim 2, characterised in that the radial guides (27a, 27b, 27c) in each case are formed as two surfaces extending parallel to a radius, on either one of the hub flange (314, 414) or a retaining element (17 with 20), which cooperate with corresponding surfaces on the brake ring flange (13, 213, 313, 413).

4. A brake disc according to one of the claims 1 to 3, in particular for rail vehicles, containing the hub body (16, 316, 416) as well as the brake ring (12, 212, 312, 412) fastened on the hub body (16, 316, 416), and that the end of the screw (15, 15') is held by the retaining element (17, 22, 422) fixed on the hub body.

5. A brake disc for rail vehicles according to one of the claims 1 to 3, characterised in that the screw (15, 15') is formed in a manner such that the head of the screw (15, 15') comprises a surface which by way of its bearing on a collar of the hub specially formed as a support there is effected a rotational a securement when screwing on and off the nut and below the head there is incorporated a knurling which on assembly of the screw (15, 15') into the hub digs into the receiver bore and by way of this (15, 15') firmly retains the screw (15, 15') in the hub with a firm press fit.

6. A brake disc according to claim 1, characterised in that on the hub flange (314, 414) and the retaining elements (17) there are provided at least three radial guides (27a, 27b, 27c) which are arranged uniformly distributed over the circumference and which may cooperate with corresponding radial guides on the brake ring flange (13, 213, 313, 413) in order to radially guide and center the brake ring flange in the case of thermal expansion.

7. A brake disc according to claim 6, characterised in that the radial guides (27a, 27b, 27c) in each case are formed as two surfaces extending parallel to a radius, on the hub flange (314, 414) and a retaining element (17 with 20), which cooperate with corresponding surfaces on the brake ring flange (13, 213, 313, 413).

8. A brake ring for a disc brake, containing a radially extending brake ring flange with axially parallel openings in which screws are arranged in order to connect a hub flange of a hub body to the brake ring, said hub flange being arranged radially overlapping and axially adjacent the brake ring flange, characterised in that at least one opening there is arranged an L-shaped retaining element which is fixed on the brake ring and by way of which the end of the screw is held after its passage through the hub flange.

9. A brake disc, according to claim 8, in particular for rail vehicles, containing the hub body as well as the brake ring fastened on the hub body (16, 316, 416) and that the end of the screw (15, 15') is held by the retaining element (17, 22, 422) fixed on the hub body or on the brake ring.

10. A brake disc for a disc brake, in particular for rail vehicles, according to claim 9, characterised in that the screw (15, 15') is formed in a manner such that the head of the screw (15, 15') comprises a surface which by way of its bearing on a collar of the hub specially formed as a support there is effected a rotational a securement when screwing on and off the nut and below the head there is incorporated a knurling which on assembly of the screw (15, 15') into the hub digs into the receiver bore and by way of this (15, 15') firmly retains the screw (15, 15') in the hub with a firm press fit.

11. A brake disc for a disc brake, in particular for rail vehicles, according to claim 9, characterised in that at least one of the retaining elements is formed as an L-shaped retaining bracket (22, 422) which in a first limb comprises an opening for leading through the end of the screw (15, 15'), and that on the hub body (316, 416) there is provided an axially orientated groove (24, 24') in which the second limb of the retaining bracket (22) may be arranged.

12. A brake disc for a disc brake, in particular for rail vehicles, according to claim 9, containing the hub body (16) with a radially outwardly extending hub flange (14, 314, 414) with axially parallel openings (114) in which screws (15, 15') are arranged in order to connect the brake ring flange (13, 213, 313, 413) of the brake ring (12, 212, 312, 412) to the hub body (16, 316, 416), the brake ring flange being arranged radially overlapping and axially adjacent the hub body, wherein with at least one opening (114) there is arranged the retaining element (17, 22, 422) which is fixed on the hub body (16, 316, 416) and by way of which the end of the screw (15, 15') is held after its passage through the brake ring flange (13, 213, 313, 413), characterised in that at least one of the retaining elements is formed as an L-shaped retaining bracket (22, 422) which in a first limb comprises an opening for leading through the end of the screw (15, 15'), and that on the hub body (316, 416) there is provided an axially orientated groove (24, 24') in which a second limb of the retaining bracket (22) is arranged.

13. A brake disc according to claim 12, characterised in that on either one of the hub flange (314, 414) or the retaining elements (17) there are provided at least three radial guides (27a, 27b, 27c) which are arranged uniformly distributed over the circumference and which may cooperate with corresponding radial guides on the brake ring flange (13, 213, 313, 413) in order to radially guide and center the brake ring flange in the case of thermal expansion.

14. A brake disc according to claim 13, characterised in that the radial guides (27a, 27b, 27c) in each case are formed as two surfaces extending parallel to a radius, on either one of the hub flange (314, 414) or a retaining element (17 with 20), which cooperate with corresponding surfaces on the brake ring flange (13, 213, 313, 413).

15. A brake disc according to claim 12, characterised in that the on hub flange (314, 414) and the retaining elements (17) there are provided at least three radial guides (27a, 27b, 27c) which are arranged uniformly distributed over the circumference and which may cooperate with corresponding radial guides on the brake ring flange (13, 213, 313, 413) in order to radially guide and center the brake ring flange in the case of thermal expansion.

16. A brake disc according to claim 15, characterised in that the radial guides (27a, 27b, 27c) in each case are formed as two surfaces extending parallel to a radius, on the hub flange (314, 414) and a retaining element (17 with 20), which cooperate with corresponding surfaces on the brake ring flange (13, 213, 313, 413).

17. A brake disc for rail vehicles, according to claim 8, characterised in that the screw (15, 15') is formed in a manner such that the head of the screw (15, 15') comprises a surface which by way of its bearing on a collar of the hub specially formed as a support there is effected a rotational a securement when screwing on and off the nut and below the head there is incorporated a knurling which on assembly of the screw (15,15') into the hub digs into the receiver bore and by way of this (15, 15') firmly retains the screw (15, 15') in the hub with a firm press fit.

18. A brake disc for a disc brake, in particular for rail vehicles, according to claim 17, containing the hub body (16, 316, 416) as well as the brake ring (12, 212, 312, 412) fastened on the hub body (16, 316, 416) and that the end of the screw (15, 15') is held by the retaining element (17, 22, 422) fixed on the hub body.

19. A brake disc for a disc brake, in particular for rail vehicles, according to claim 17, characterised in that at least one of the retaining elements is formed as an L-shaped retaining bracket (22, 422) which in a first limb comprises an opening for leading through the end of the screw (15, 15'), and that on the hub body (316, 416) there is provided an axially orientated groove (24, 24') in which the second limb of the retaining bracket (22) may be arranged.

20. A brake disc for a disc brake, in particular for rail vehicles, according to claim 17, containing the hub body as well as a brake ring fastened on the hub body, and that the end of the screw (15, 15') is held by the retaining element (17, 22, 422) fixed the hub body or the brake ring.

* * * * *